US012789689B2

(12) United States Patent
Murali Krishnaa et al.

(10) Patent No.: US 12,789,689 B2
(45) Date of Patent: Nov. 10, 2026

(54) HYDRAULIC CYLINDER ASSEMBLY

(71) Applicant: Hyva Holding B.V., AK Alphen aan den Rijn (NL)

(72) Inventors: Nikhil Murali Krishnaa, Chennai (IN); Ajinkya Hemant Dange, Leiden (NL)

(73) Assignee: Hyva Holding B.V., Alphen aan den Rijn (NL)

( * ) Notice: Subject to any disclaimer, the term of this patent is extended or adjusted under 35 U.S.C. 154(b) by 319 days.

(21) Appl. No.: 18/545,066

(22) Filed: Dec. 19, 2023

(65) Prior Publication Data

US 2024/0198884 A1 Jun. 20, 2024

(30) Foreign Application Priority Data

Dec. 20, 2022 (GB) ..................................... 2219292

(51) Int. Cl.

| | |
|---|---|
| ***B60P 1/16*** | (2006.01) |
| ***F15B 1/26*** | (2006.01) |
| ***F15B 13/02*** | (2006.01) |
| ***F15B 15/18*** | (2006.01) |
| ***F15B 15/24*** | (2006.01) |
| ***F15B 19/00*** | (2006.01) |

(52) U.S. Cl.

CPC ................ *B60P 1/162* (2013.01); *F15B 1/26* (2013.01); *F15B 13/027* (2013.01); *F15B 15/18* (2013.01); *F15B 15/24* (2013.01); *F15B 19/00* (2013.01)

(58) Field of Classification Search

CPC .......... F15B 15/18; F15B 1/26; F15B 13/027; F15B 15/24; F15B 19/00; B60P 1/162

See application file for complete search history.

(56) References Cited

U.S. PATENT DOCUMENTS

| | | | | |
|---|---|---|---|---|
| 6,286,412 B1 | | 9/2001 | Manring et al. | |
| 2025/0059728 A1 | * | 2/2025 | Kowatari | .................. E02F 9/22 |

FOREIGN PATENT DOCUMENTS

| | | | | | |
|---|---|---|---|---|---|
| CN | 113404748 A | * | 9/2021 | ................ H02J 7/14 |
| EP | 2364877 A1 | * | 9/2011 | ............. B60P 1/283 |
| EP | 3670913 A1 | | 6/2020 | |
| WO | 2020169157 A1 | | 8/2020 | |

OTHER PUBLICATIONS

Search Report under Section 17 for international application No. GB2219292.6 dated Jul. 3, 2023, 4 pages.

* cited by examiner

*Primary Examiner* — Dany E Akakpo
(74) *Attorney, Agent, or Firm* — Brooks Kushman, P.C.

(57) ABSTRACT

A hydraulic cylinder assembly comprising: a single-acting hydraulic cylinder; an oil tank; a fluid line fluidically connecting the oil tank with the hydraulic cylinder; and a motor unit comprising a pump disposed in the fluid line and comprising a motor configured to operate the pump to pump fluid from the oil tank to the hydraulic cylinder to extend the hydraulic cylinder, and to permit flow of fluid from the hydraulic cylinder to the oil tank through the pump during retraction of the hydraulic cylinder, a pressure sensor configured to output a pressure signal indicative of pressure of hydraulic fluid in the hydraulic cylinder; and a controller configured to control the motor unit based on pressure signals received from the pressure sensor. The hydraulic cylinder assembly is configured so that oil leaving the hydraulic cylinder, during retraction of the hydraulic cylinder, passes through the pump to the oil tank.

17 Claims, 5 Drawing Sheets

200

HYDRAULIC CYLINDER ASSEMBLY

CROSS-REFERENCE TO RELATED APPLICATIONS

This application claims foreign priority benefits under 35 U.S.C. § 119(a)-(d) to application number GB2219292.6, filed Dec. 20, 2022, which is incorporated by reference in its entirety.

TECHNICAL FIELD

The present invention relates to a hydraulic cylinder assembly, a tipper truck comprising the hydraulic cylinder assembly, and a method of controlling the hydraulic cylinder assembly.

BACKGROUND

Hydraulic cylinder assemblies typically comprise a directional control valve having at least 3-way directional control in a fluid line between a pump, tank and a hydraulic cylinder in order to control a direction of flow of fluid to retract or extend the hydraulic cylinder, and to allow bypassing of a pump. However, such 3-way directional control valves can be complex.

SUMMARY

According to a first aspect, there is provided a hydraulic cylinder assembly comprising: a single-acting hydraulic cylinder;

- an oil tank;
- a fluid line fluidically connecting the oil tank with the hydraulic cylinder; and
- a motor unit comprising a pump disposed in the fluid line and comprising a motor configured to operate the pump to pump fluid from the oil tank to the hydraulic cylinder to extend the hydraulic cylinder, and to permit flow of fluid from the hydraulic cylinder to the oil tank through the pump during retraction of the hydraulic cylinder,
- a pressure sensor configured to output a pressure signal indicative of pressure of hydraulic fluid in the hydraulic cylinder; and
- a controller configured to control the motor unit based on pressure signals received from the pressure sensor;
- wherein the hydraulic cylinder assembly is configured so that oil leaving the hydraulic cylinder, during retraction of the hydraulic cylinder, passes through the pump to the oil tank.

The motor unit may be considered a direct drive motor unit with the motor directly controlling extension or retraction of the hydraulic cylinder. The fluid line may be the only fluid line fluidically connecting the hydraulic cylinder to the oil tank. There may be no other fluid connection from the hydraulic cylinder to the oil tank so that fluid must pass through the pump when passing between the hydraulic cylinder and the oil tank. Since there is only a single fluid line, with no branches, there may be no directional control valve, such as a 3-way valve, in the fluid line to control the hydraulic cylinder. For example, there may be a valve with no more than 2-ways in the fluid line to control fluid flow through the fluid line. Pressure relief of the hydraulic cylinder may be controlled solely by controlling the motor unit based on the signals received from the sensor, or by a passive pressure relief valve.

It may be that the motor unit is controlled in a pressure relief mode, if the pressure signals indicate a spike in pressure over an upper pressure threshold.

An indication of a spike in pressure may be a predicted spike in pressure, or an actual spike in pressure. The predicted spike in pressure may be if a pressure change rate is too high. The pressure relief mode may comprise reducing the motor speed, or stopping the motor, or reversing the motor to allow leakage to the oil tank.

It may be that the motor unit is controlled in a cavitation safe mode, by reducing the speed of the motor, if the pressure signals indicate a dip in pressure below a lower pressure threshold, during retraction of the hydraulic cylinder.

It may be that the motor unit comprises a generator which is configured to recover energy from oil flowing from the hydraulic cylinder to the oil tank, during retraction of the hydraulic cylinder.

It may be that the hydraulic cylinder assembly further comprises a command unit configured to receive operation commands to extend or retract the hydraulic cylinder and to output a corresponding command signal;

- wherein the controller is further configured to control the motor unit based on the command signals received from the command unit.

It may be that the hydraulic cylinder assembly further comprises a speed sensor configured to output a speed signal indicative of a speed of extension or retraction of the cylinder;

- wherein, if the command signal indicates a command to retract the hydraulic cylinder, the controller is configured to:
- receive a speed signal from the speed sensor; and
- if the speed signal is above a speed threshold, recover energy from the flow of hydraulic fluid through the motor unit with the generator, and
- if the speed signal is below a threshold, control the motor unit to increase the speed of the cylinder, by pumping hydraulic fluid faster from the hydraulic cylinder to the oil tank.

It may be that the hydraulic cylinder comprises an extension sensor, configured to output an extension signal indicative of the amount of extension of the hydraulic cylinder. It may be that the controller is configured to determine, based on the command signal and the extension signal, whether hydraulic fluid is leaking; and control the motor unit based on the determination.

It may be that the determination of hydraulic fluid leaking comprises monitoring whether the hydraulic cylinder is retracting while the command signal indicates a command to extend or maintain a position of the hydraulic cylinder, based on the extension signal and the command signal. It may be that if it is determined that the hydraulic cylinder is retracting while the command signal indicates a command to extend or maintain a position of the hydraulic cylinder, determining that hydraulic fluid is leaking.

It may be that controlling the motor unit based on the determination comprises, if it is determined that hydraulic fluid is leaking, increasing the speed of the motor to increase the flow rate of hydraulic fluid through the motor unit to the hydraulic cylinder.

It may be that the hydraulic cylinder comprise a 2/2 valve for permitting fluid return from the hydraulic cylinder to the oil tank, through the pump in a bypass position, and by preventing fluid return from the hydraulic cylinder to the oil tank through the pump in a check valve position.

It may be that the hydraulic cylinder further comprises a brake configured to engage with a shaft between the motor and the pump to apply braking action to the pump, wherein the brake is configured to be electrically disengaged, so that it is configured to fail in an engaged position.

According to a second aspect, there is provided a tipper truck comprising:

a chassis and a tipper body attached to the chassis at a pivot point, the tipper body thereby configured to be pivoted relative to the chassis; and a hydraulic cylinder assembly according to the first aspect, the hydraulic cylinder being disposed between the chassis and the tipper bed and configured to tilt the tipper bed relative to the chassis.

According to a third aspect, there is provided a method of controlling a hydraulic cylinder assembly according to the first aspect, the method comprising:

receiving a pressure signal from the pressure sensor; and controlling the motor unit based on the pressure signal.

Controlling the motor unit may comprise controlling the speed and direction of flow of hydraulic fluid through the motor unit.

It may be that, if the pressure signals indicate a spike in pressure over an upper pressure threshold, controlling the motor unit to enter a pressure relief mode.

The spike in pressure may be an absolute pressure over an upper pressure threshold, or may be a pressure change rate which is over the upper pressure threshold, and which therefore indicates a predicted pressure spike.

It may be that if the pressure signals indicate a dip in pressure below a lower pressure threshold, controlling the motor unit to enter a cavitation safe mode.

It may be that the method comprises receiving a command signal from the command unit; and controlling the motor unit based on the command signal.

It may be that the method comprises receiving a speed signal from the speed sensor indicative of a speed of extension or retraction of the hydraulic cylinder; and if the speed signal is above a speed threshold, recovering energy from the flow of hydraulic fluid through the motor-pump unit with a generator, and if the speed signal is below a threshold, control the motor unit to increase the speed of the cylinder, by pumping hydraulic fluid faster to from the hydraulic cylinder to the oil tank.

It may be that the method comprises receiving an extension signal from the extension sensor;

determining, based on the command signal and the extension signal, whether hydraulic fluid is leaking; and controlling the motor unit based on the determination.

It may be that determining whether hydraulic fluid is leaking comprises monitoring whether the hydraulic cylinder is retracting while the command signal indicates a command to extend or maintain a position of the hydraulic cylinder, based on the extension signal and the command signal. It may be that, if it is determined that the hydraulic cylinder is retracting while the command signal indicates a command to extend or maintain a position of the hydraulic cylinder, determining that hydraulic fluid is leaking.

It may be that controlling the motor unit based on the determination comprises, if it is determined that hydraulic fluid is leaking, increasing the speed of the motor to increase the flow rate of hydraulic fluid through the motor unit to the hydraulic cylinder.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described, by way of example only, with reference to the accompanying Figures, in which.

DETAILED DESCRIPTION

Figure 1:
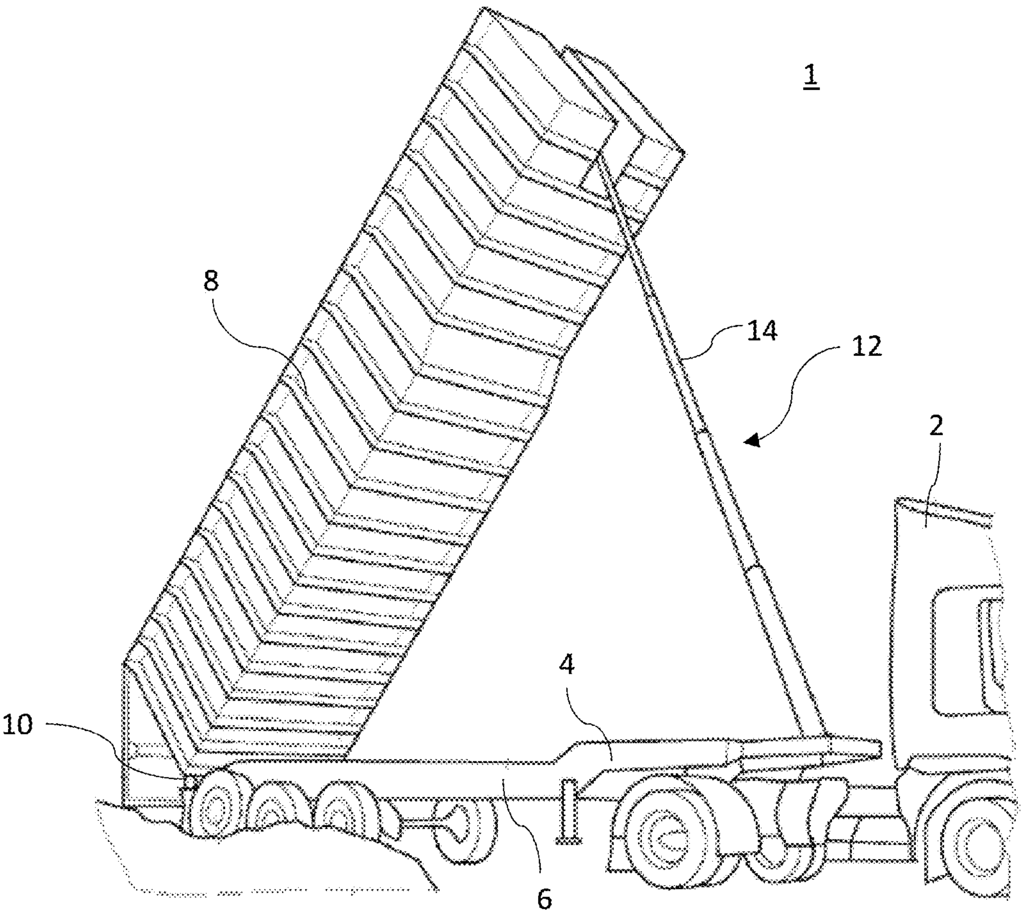
FIG. 1 schematically shows a perspective view of a tipper truck comprising an example hydraulic cylinder assembly.

FIG. 1 shows a tipper truck 1, sometimes referred to as a dump truck, comprising a tractor 2 and a trailer 4. The trailer 4 has a trailer chassis or frame 6, and a tipper body 8 is pivotably mounted thereto. The tipper body 8 is pivotably mounted to the chassis 6 about a pivot point 10 that is located at the rear of the chassis 6.

A hydraulic cylinder assembly 12 is provided comprising a single-acting hydraulic cylinder 14 which is provided that is pivotably attached at a lower end to the front of the chassis 6 and pivotably attached at an upper end to the front of the tipper body 8. The hydraulic cylinder 14 can be extended (as in FIG. 1) to pivot the tipper body 8 about the pivot point 10 to a fully tipped position, by pumping hydraulic fluid into the hydraulic cylinder 14. In the tipped position, any load within the tipper body 8 is emptied onto the ground. The cylinder 14 can be retracted, by permitting the hydraulic fluid to flow out of the hydraulic cylinder 14, or by pumping the hydraulic fluid out of the hydraulic cylinder 14, so as to pivot the tipper body 8 back to a resting position in which it rests on the chassis 6. Since the lower end of the hydraulic cylinder 14 is pivotably fixed to the chassis 6 and the upper end of the hydraulic cylinder 14 is pivotably fixed to the tipper body 8, there is a fixed relationship between the length of the hydraulic cylinder, the inclination angle $\alpha$ of the cylinder 14 relative to the chassis, and the tip angle $\theta$ of the tipper body 8 relative to the chassis 6.

Figure 2:
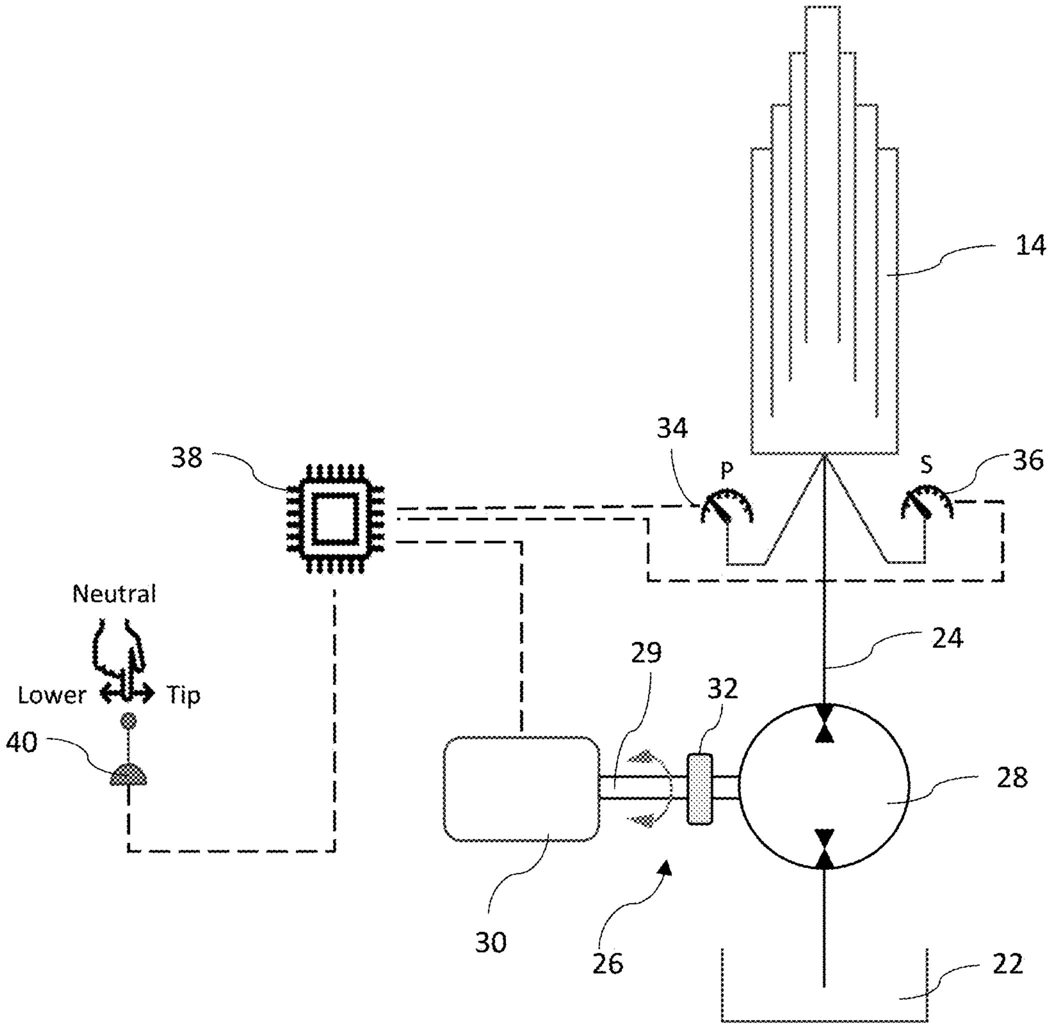
FIG. 2 schematically shows a first example hydraulic cylinder assembly for use in the tipper truck in FIG. 1.

The hydraulic cylinder assembly 12 is shown in more detail in FIG. 2, and further comprises an oil tank 22, a fluid line 24 which fluidically connects the oil tank 22 with the hydraulic cylinder 14, and a motor unit 26 comprising a pump 28 disposed in the fluid line 24, the pump 28 being connected to a motor 30 of the motor unit 26 via a shaft 29 between the motor and the pump. The motor 30 is configured to operate the pump 28 to pump fluid from the oil tank 22 to the hydraulic cylinder 14 to extend the hydraulic cylinder. The motor 30 is also configured to permit flow of fluid from the hydraulic cylinder 14 to the oil tank 22 through the pump 28 during retraction of the hydraulic cylinder 14. In some examples, the motor may be configured to actively pump fluid from the hydraulic cylinder 14 to the oil tank 22 to actively retract the hydraulic cylinder 14, in other words, the motor unit may be a direct drive motor unit with the motor directly controlling extension and retraction of the hydraulic cylinder 14. In other examples, the motor may be configured to passively permit flow of fluid through the pump 28 from the hydraulic cylinder 14 to the oil tank 22.

The fluid line 24 is the only fluid line fluidically connecting the hydraulic cylinder 14 to the oil tank 22. There is no other fluid connection from the hydraulic cylinder 14 to the oil tank 22 so that fluid must pass through the pump 28 when passing between the hydraulic cylinder 14 and the oil tank 22 in either direction. For example, when the hydraulic cylinder 14 is retracting, hydraulic fluid leaving the hydraulic cylinder 14 passes through the pump 28 to the oil tank 22. There is no 3-way (or more than 3-way) directional control valve in the fluid line 24 to control the hydraulic cylinder, but rather the hydraulic cylinder 14 is directly controlled by the motor 30. Pressure relief of the hydraulic cylinder 14 may be controlled solely by controlling the motor unit 26, in this example.

In this example, the hydraulic cylinder assembly 12 comprises a brake 32 configured to engage with the shaft 29 to apply braking action to the pump 28. The brake 32 in this example is configured to be electrically disengaged, so that it is configured to fail in an engaged position, in order to ensure safer operation of the hydraulic cylinder assembly 12. In other examples, there may be no brake.

In this example, the motor unit 26 also comprises a generator 30, which is a part of the motor 30 in the form of a motor/generator. The generator acts passively based on hydraulic fluid pressures in the fluid line 24, to recover energy from oil flowing from the hydraulic cylinder 14 to the oil tank 22 during retraction of the hydraulic cylinder 14, by generating electricity. In other examples, there may be no generator in the motor unit.

In this example, the hydraulic cylinder assembly 12 comprises a pressure sensor 34 configured to output pressure signals indicative of pressure of hydraulic fluid in the hydraulic cylinder 14. The pressure sensor may monitor pressure, or any other characteristic which is indicative of pressure such as temperature, torque and/or other electric parameters.

In this example, the hydraulic cylinder assembly 12 comprises a speed sensor 36 which is configured to output a speed signal indicative of a speed of extension or retraction of the hydraulic cylinder 14. In this example, the speed sensor 36 is in the form of an extension sensor, which monitors the position of the hydraulic cylinder 14, from which the speed of retraction of extension can be derived based on the differential of the position. The speed signal may therefore also be referred to as an extension signal, which is indicative of the amount of extension of the hydraulic cylinder 14, and is therefore indicative of the speed of extension or retraction of the hydraulic cylinder 14.

The hydraulic cylinder assembly 12 further comprises a controller 38, which is configured to control the motor unit 26 based on at least pressure signals received from the pressure sensor 34.

The hydraulic cylinder assembly 12, in this example, also comprises a command unit 40 configured to receive operation commands to extend or retract the hydraulic cylinder 14, and to output a corresponding command signal. The operation commands may be received from an input device like a manual lever configured to be operated by a user. In some examples, the operation commands from input device may be overridden by safety protocols, based on, for example, pressure signals indicating an overpressure condition in the hydraulic cylinder 14, or a risk of a predicted overpressure condition occurring.

In this example, the command signals are sent to the controller 38 from the command unit 40, and the controller 38 is configured to control the motor unit 26 further based on the command signals. For example, if the manual lever is operated by a user towards a "tip" position, the command unit 40 receives an operation command to extend, which should be transmitted as a command signal to extend to the controller 38. However, if a safety protocol determines that it would be unsafe to extend, the operation command may be overridden, and a command signal to retract or hold the position may instead be transmitted to the controller 38.

Having a hydraulic cylinder assembly which is arranged in this manner means that there is no need for a 3-way directional control valve. Such a valve can additionally have a pressure relief valve which allows fluid to bypass the high pressure flow when there is an overpressure condition. Without a line relieving the high pressure flow, there is a risk of an overpressure condition not being mitigated in the hydraulic cylinder. However, with this arrangement, the overpressure condition can be sensed by the pressure sensor, and can be mitigated by correspondingly controlling the motor unit.

Figure 3:
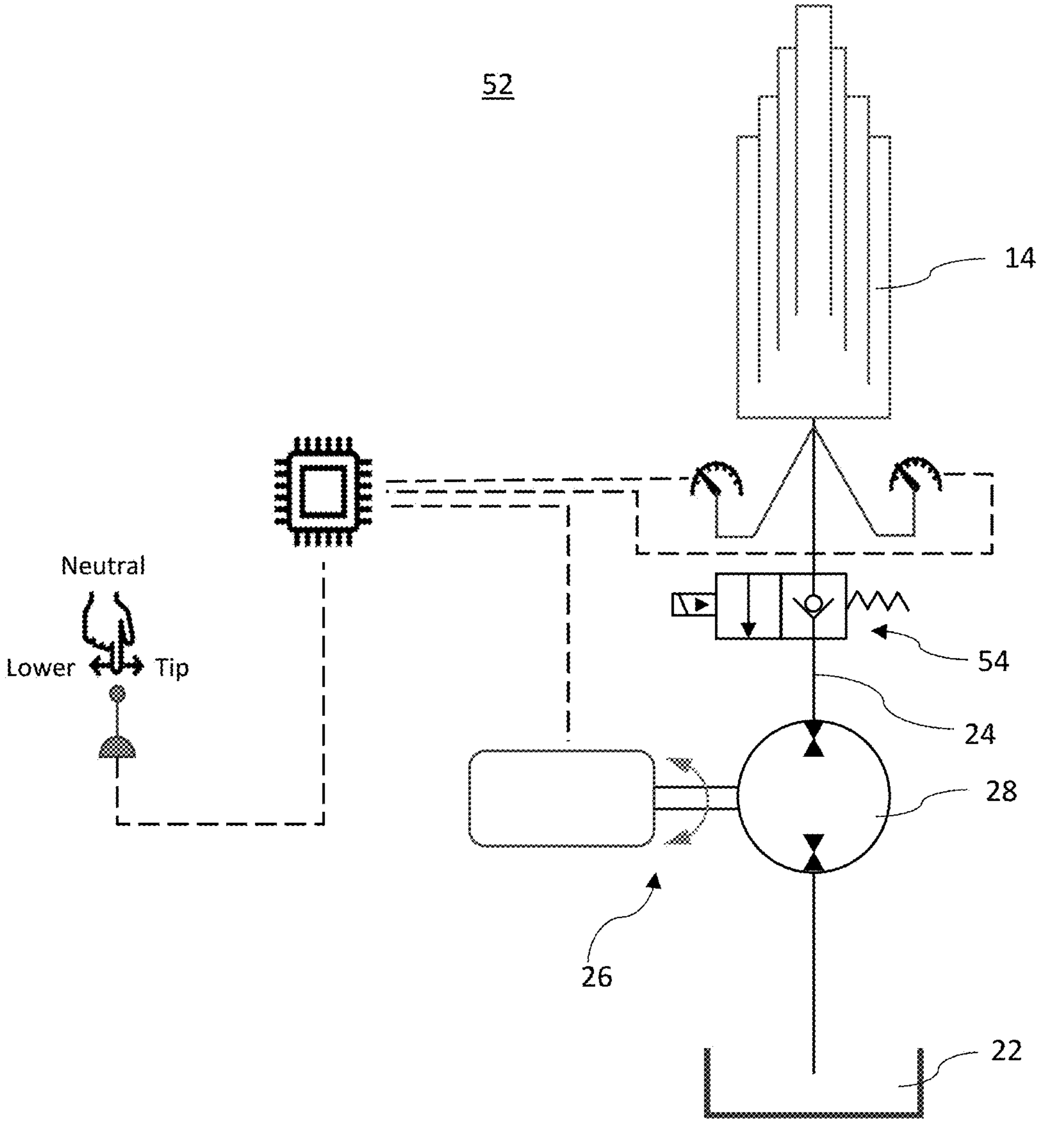
FIG. 3 schematically shows a second example hydraulic cylinder assembly for use in the tipper truck in FIG. 1.

FIG. 3 shows a second example hydraulic cylinder assembly 52, which is similar to the first example hydraulic cylinder assembly 12 but differs in that it additionally comprises a pressure shielding valve 54 disposed in the fluid 24 between the pump 28 and the hydraulic cylinder 14, which is configured to enable shielding of fluid in the hydraulic cylinder 14 from the pressure in the pump 28, and to hold the hydraulic cylinder 14 in place, without the need for a brake.

In this example, the pressure shielding valve 54 comprises a 2/2 valve (i.e., 2-way, 2-position valve). In a check valve position, the pressure shielding valve 54 in this example comprises a check valve, permitting fluid flow only from the oil tank 22 to the hydraulic cylinder 14, and preventing fluid return from the hydraulic cylinder 14 to the oil tank 22 through the pump 28. In a bypass position, there may be an open line, or a directional line allowing fluid flow from the hydraulic cylinder 14 to the oil tank 22 through the pump 28. In this example, the position of the pressure shielding valve 54 is controlled by a solenoid. In other examples, the pressure shielding valve 54 position may be passively controlled, for example with pilot pressures from pressure differences in the hydraulic fluid. Pressure relief of the hydraulic cylinder 14 may also be controlled by controlling the motor unit 26, in this example.

Figure 4:
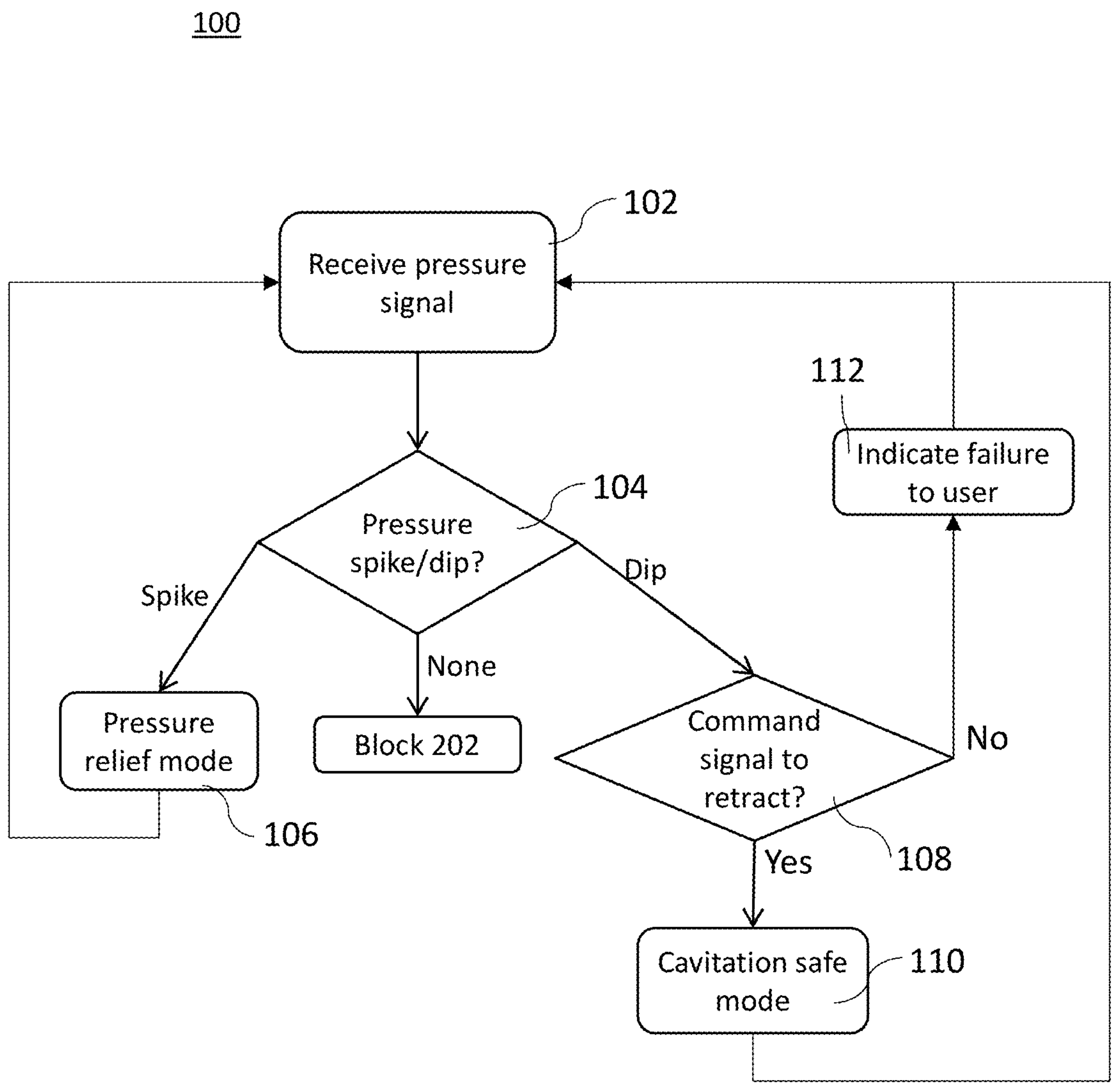
FIG. 4 is a flow chart showing a method of controlling an example hydraulic cylinder assembly.

FIG. 4 is a flow chart showing steps of a method 100 of controlling the hydraulic cylinder assembly 12, 52.

In block 102, the method 100 comprises receiving a pressure signal. In its most basic form, the method 100 comprises controlling the motor unit 26 based on the pressure signal. Controlling the motor unit 26 may include controlling the speed and direction of flow of hydraulic fluid through the motor unit 26. For example, if the pressure signal indicates an overpressure condition in the hydraulic cylinder 14, the motor unit 26 may be controlled to pump hydraulic fluid from the hydraulic cylinder 14 to the oil tank 22, to retract the hydraulic cylinder, irrespective of an operation command to extend the hydraulic cylinder.

In block 104, the method 100 comprises determining whether there is an indication of a spike or a dip in the pressure. An indication of a spike in pressure may relate to pressure of fluid in the hydraulic cylinder 14 rising above an upper pressure threshold. An indication of a spike in pressure may be a predicted spike in pressure, or an actual spike in pressure. In some examples, the predicted spike in pressure may be when a pressure change rate is too high (e.g., above an upper change rate threshold).

Similarly, an indication of a dip in pressure may relate to pressure of fluid in the hydraulic cylinder 14 falling below a lower pressure threshold. An indication of a dip in pressure may be a predicted dip in pressure, or an actual dip in pressure. In some examples, the predicted dip in pressure may be when a pressure change rate is too low (e.g., below a lower change rate threshold, i.e., $dP<T$ where T is negative pressure change rate threshold, or an absolute value above an upper change rate threshold, i.e., $|dP|>|T|$).

If there is no indication of a spike or a dip in pressure, the method 100 may proceed to block 202, which is described with reference to the method in FIG. 5, below. In other examples, the method may return to block 102 if there is no indication of a spike or dip in pressure.

If there is an indication of a pressure spike, the method 100 may proceed to block 106, in which a system including, for example, the motor unit 26, the brake 32 and/or the pressure shielding valve 54, is controlled to enter a pressure relief mode. In block 106, the method may include overriding a user input from the manual lever. A pressure relief mode may include controlling the motor unit 26 to permit fluid to flow from the hydraulic cylinder 14 to the oil tank 22, either passively allowing leakage to the oil tank 22 through the pump 28, or by actively pumping the fluid with the pump 28. The pressure relief mode may alternatively comprise reducing the motor speed to reduce the speed of pumping of hydraulic fluid from the oil tank 22 to the hydraulic cylinder 14, or stopping the motor, to stop pumping of fluid in either direction. In the second example hydraulic cylinder assembly 52 described with reference to FIG. 3, the pressure relief mode may further include moving the pressure shielding valve 54 to the bypass position to permit fluid to flow from the hydraulic cylinder 14 to the oil tank 22.

If there is an indication of a pressure dip, the method 100 may proceed to block 108 in which a determination is made of whether there is a command signal to retract the hydraulic cylinder 14. If there is no command signal to retract the hydraulic cylinder 14, the method 100 may return to block 102, via block 112 in which the user may be sent an indication of failure, for example through a user interface. For example, if there is no command signal to retract the hydraulic cylinder 14, but there is a pressure dip, this could indicate a serious leak in the system. If there is a command signal to retract the hydraulic cylinder 14, the method 100 may proceed to block 110 in which the system (e.g., the motor unit 26) is controlled to enter a cavitation safe mode. In block 110, the method may include overriding a user input from the input device. In the cavitation safe mode, the motor speed may be reduced or stopped in order to reduce or stop hydraulic fluid from flowing from the hydraulic cylinder 14 to the oil tank 22. This should reduce the likelihood that cavitation will occur in the hydraulic fluid between the pump 28 and the hydraulic cylinder 14.

Figure 5:
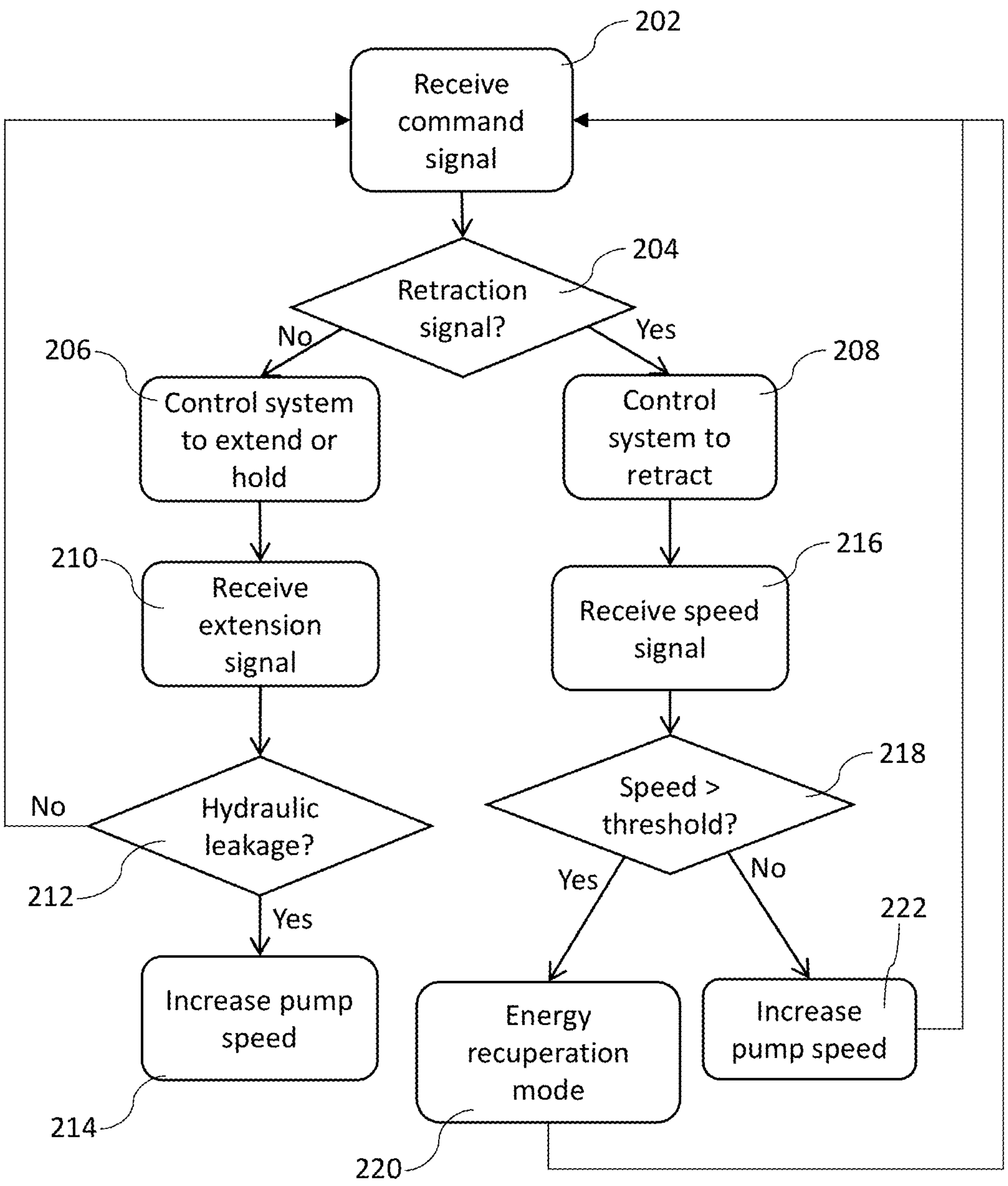
FIG. 5 is a flow chart showing a method of controlling an example hydraulic cylinder assembly.

FIG. 5 is a flow chart showing steps of a sub-method 200 of controlling the hydraulic cylinder assembly 12, 52.

In block 202, a command signal is received from the command unit 40. In its simplest form, the sub-method 200 comprises controlling the motor unit 26 based on the command signal.

In block 204, the sub-method 200 comprises determining whether the command signal indicates a retraction. If the command signal does not indicate retraction (i.e., it indicates extension, or maintaining a position), the sub-method 200 may proceed to block 206. If the command signal indicates retraction, the sub-method 200 may proceed to block 208.

In block 206, the sub-method 200 comprises controlling the system to pump fluid from the oil tank 22 to the hydraulic cylinder 14 to extend the hydraulic cylinder 14, or to hold the hydraulic cylinder 14 in place, for example by applying the brake 32 to the motor unit 26 and/or by controlling the pressure shielding valve 54 to prevent fluid movement from the hydraulic cylinder 14 to the oil tank 22. The sub-method 200 then proceeds to block 210, which comprises receiving an extension signal, the extension signal being indicative of the amount of extension of the hydraulic cylinder 14.

In block 212, following block 210, the sub-method 200 comprises determining, based on the extension signal and the command signal, whether hydraulic fluid is leaking from the hydraulic cylinder 14. For example, if the command signal indicates that the hydraulic cylinder 14 should be extending, then if it is not extending or if it is retracting, this would indicate hydraulic fluid leakage. Similarly, if the command signal indicates maintaining a position of the hydraulic cylinder 14, if the hydraulic cylinder is retracting (determined based on the extension signal), then this would indicate that there is hydraulic fluid leakage.

If it is determined, in block 212, that there is no hydraulic leakage, then the sub-method 200 may return to block 202. If it is determined, in block 212, that there is hydraulic leakage, then the sub-method 200 may proceed to block 214, in which the pump 28 speed is increased, to counteract the hydraulic leakage.

In block 208, after determining that the command signal indicates retraction, the sub-method 200 comprises controlling the system (including at least the motor unit 26 in this example) to retract the hydraulic cylinder 14, for example, by permitting hydraulic fluid to flow from the hydraulic cylinder 14 through the pump 28 to the oil tank 22, or by actively pumping the hydraulic fluid out of the hydraulic cylinder 14.

In block 216, the sub-method 200 comprises receiving a speed signal from the speed sensor, indicative of a speed of movement of the hydraulic cylinder. In block 218, it is determined whether the speed of the hydraulic cylinder 14 is above a speed threshold. If the speed of retraction of the hydraulic cylinder 14 is determined to be above the speed threshold, the sub-method 200 may proceed to block 220, in which the motor unit 26 enters an energy recuperation mode. In the energy recuperation mode, the generator is used to recuperate energy from the flow of hydraulic fluid from the hydraulic cylinder 14 to the oil tank 22 through the pump 28. This slows the flow of hydraulic fluid down through the pump 28, due to the resistance of the generator, as well as generating electrical energy.

If the speed of retraction of the hydraulic cylinder 14 is determined not to be above the speed threshold, the sub-method 200 may proceed to block 222, in which the pump 28 speed of the motor unit 26 is increased, to increase the speed of retraction of the hydraulic cylinder 14. Although block 218 is described as comparing the speed against a threshold, the speed may be compared to an allowable range, and if it falls within the allowable range, the method returns to block 202, while if the speed of retraction rises above the allowable range, the method proceeds to block 220, and if it falls below the allowable range, the method proceeds to block 222.

Although the blocks in the methods have been shown in a particular order, it will be appreciated that any suitable order can be used to achieve the same or similar control. For example, it will be appreciated that the methods 100, 200 described with reference to FIGS. 4 and 5 may run concurrently, with the method 100 of FIG. 4 taking precedence over the method 200 of FIG. 5, if the control outputs of the two methods 100, 200 are conflicting. The control output of the method 200 of FIG. 5 may affect the control output of the method of FIG. 4. For example, in block 222 of FIG. 5, the retracting pump speed is increased, which increases the likelihood of a pressure dip in the hydraulic cylinder 14, such that the method 100 of FIG. 4 may force the system to enter the cavitation safe mode in block 110 to reduce the pump speed, irrespective of the output of the method 200 of FIG. 5. This is to ensure safety and mitigate potential damage to the hydraulic cylinder assembly 12.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

What is claimed is:

1. A hydraulic cylinder assembly comprising:
- a single-acting hydraulic cylinder;
- an oil tank;
- a fluid line fluidically connecting the oil tank with the hydraulic cylinder; and
- a motor unit including a pump disposed in the fluid line and a motor configured to operate the pump to pump fluid from the oil tank to the hydraulic cylinder to extend the hydraulic cylinder, and to permit flow of fluid from the hydraulic cylinder to the oil tank through the pump during retraction of the hydraulic cylinder,
- a pressure sensor arranged at the hydraulic cylinder and configured to output at least one pressure signal indicative of pressure of hydraulic fluid in the hydraulic cylinder; and
- a controller configured to control the motor unit based on the at least one pressure signal received from the pressure sensor;
- wherein the hydraulic cylinder assembly is configured so that oil leaving the hydraulic cylinder, during retraction of the hydraulic cylinder, passes through the pump to the oil tank, and
- a brake configured to engage with a shaft between the motor and the pump to apply braking action to the pump, wherein the brake is configured to be disengaged, so that it is configured to fail in an engaged position.

2. A hydraulic cylinder assembly according to claim 1, wherein the controller is programmed to operate the motor unit in a pressure relief mode in response to the at least one pressure signal indicating a spike in pressure over an upper pressure threshold.

3. A hydraulic cylinder assembly according to claim 1, wherein the controller is programmed to operate the motor unit in a cavitation mode by reducing the speed of the motor in response to the at least one pressure signal indicating a dip in pressure below a lower pressure threshold, during retraction of the hydraulic cylinder.

4. A hydraulic cylinder assembly according to claim 1, wherein the motor unit includes a generator configured to recover energy from oil flowing from the hydraulic cylinder to the oil tank, during retraction of the hydraulic cylinder.

5. A hydraulic cylinder assembly according to claim 4, further comprising a command unit configured to receive operation commands to extend or retract the hydraulic cylinder and to output a corresponding command signal;
- wherein the controller is further configured to control the motor unit based on the command signals received from the command unit.

6. A hydraulic cylinder assembly according to claim 5, further comprising:
- a speed sensor configured to output a speed signal indicative of a speed of extension or retraction of the cylinder;
- wherein, in response to the command signal indicating a command to retract the hydraulic cylinder, the controller further configured to:
  - receive the speed signal from the speed sensor; and
  - in response to the speed signal being above a speed threshold, recover energy from the flow of hydraulic fluid through the motor unit with the generator, and
  - in response to the speed signal being below the speed threshold, controlling the motor unit to increase the speed of the cylinder by pumping hydraulic fluid faster from the hydraulic cylinder to the oil tank.

7. A hydraulic cylinder assembly according to claim 6, wherein the hydraulic cylinder includes an extension sensor configured to output an extension signal indicative of the amount of extension of the hydraulic cylinder;
- wherein the controller is further configured to:
- determine, based on the command signal and the extension signal, whether hydraulic fluid is leaking; and
- control the motor unit based on the determination.

8. A hydraulic cylinder assembly according to claim 7,
- wherein the determination of hydraulic fluid leaking includes determining that the hydraulic cylinder is retracting while the command signal indicates a command to extend or maintain a position of the hydraulic cylinder, based on the extension signal and the command signal.

9. A hydraulic cylinder assembly according to claim 8, wherein, in response to determining that hydraulic fluid is leaking, controlling the motor unit to increase the speed of the motor to increase the flow rate of hydraulic fluid through the motor unit to the hydraulic cylinder.

10. A hydraulic cylinder assembly according to claim 1, further comprising a 2/2 valve arranged on the fluid line for permitting fluid return from the hydraulic cylinder to the oil tank through the pump in a bypass position, and for preventing fluid return from the hydraulic cylinder to the oil tank through the pump in a check valve position.

11. A tipper truck comprising:
- a chassis and a tipper body attached to the chassis at a pivot point, the tipper body configured to be pivotable relative to the chassis; and
- a hydraulic cylinder assembly according to claim 1, the hydraulic cylinder being disposed between the chassis and the tipper body and configured to tilt the tipper body relative to the chassis.

12. A method of controlling a hydraulic cylinder assembly, the method comprising:

receiving a pressure signal from a pressure sensor configured to output a pressure signal indicative of pressure of hydraulic fluid in a hydraulic cylinder;

controlling a motor unit having a pump disposed in a fluid line fluidically connecting the hydraulic cylinder to an oil tank and a motor configured to operate the pump to pump fluid from the oil tank to the hydraulic cylinder based on the pressure signal, wherein the hydraulic cylinder is configured so that oil leaving the hydraulic cylinder, during retraction of the hydraulic cylinder, passes through the pump to the oil tank, receiving a command signal from a command unit;

controlling the motor unit based on the command signal;

in response to the command signal indicating a command to retract the hydraulic cylinder from a user:

receiving a speed signal from a speed sensor indicative of a speed of extension or retraction of the hydraulic cylinder; and in response to the speed signal being above a speed threshold, recovering energy from the flow of hydraulic fluid through the motor unit with a generator, and in response to the speed signal being below a threshold, controlling the motor unit to increase the speed of the cylinder, by pumping hydraulic fluid faster to from the hydraulic cylinder to the oil tank.

13. A method according to claim 12, comprising:

in response to the pressure signal indicating a spike in pressure over an upper pressure threshold, controlling the motor unit to enter a pressure relief mode.

14. A method according to claim 12, comprising:

in response to the pressure signal indicating a dip in pressure below a lower pressure threshold, controlling the motor unit to enter a cavitation safe mode.

15. A method according to claim 12, further comprising:

receiving an extension signal from an extension sensor;

determining, based on the command signal and the extension signal, whether hydraulic fluid is leaking; and controlling the motor unit based on the determination.

16. A method according to claim 15, wherein determining whether hydraulic fluid is leaking includes monitoring whether the hydraulic cylinder is retracting while the command signal indicates a command to extend or maintain a position of the hydraulic cylinder, based on the extension signal and the command signal.

17. A method according to claim 16, further comprising, in response to determining that hydraulic fluid is leaking, controlling the motor unit to increase the speed of the motor to increase the flow rate of hydraulic fluid through the motor unit to the hydraulic cylinder.

* * * * *